United States Patent

Lindenmeier et al.

[11] Patent Number: 6,011,962
[45] Date of Patent: Jan. 4, 2000

[54] CIRCUIT FOR TESTING THE FUNCTION OF MOBILE RECEIVING INSTALLATIONS

[75] Inventors: Heinz Lindenmeier, Planegg; Jochen Hopf, Haar; Leopold Reiter, Gilching, all of Germany

[73] Assignee: Fuba Automotive GmbH, Salzdetfurth, Germany

[21] Appl. No.: 08/852,561

[22] Filed: May 7, 1997

[30] Foreign Application Priority Data

May 7, 1996 [DE] Germany .................... 196 18 333

[51] Int. Cl.⁷ .................................................... H04B 17/00
[52] U.S. Cl. ...................... 455/226.1; 455/67.1; 455/423
[58] Field of Search ............................. 455/226.1, 226.2, 455/226.4, 67.1, 67.4, 67.7, 423, 272

[56] References Cited

U.S. PATENT DOCUMENTS

| | | | |
|---|---|---|---|
| 4,188,579 | 2/1980 | Yoshisato | 455/67.1 |
| 4,225,969 | 9/1980 | Hong | 455/67.4 |
| 4,361,904 | 11/1982 | Matsumura | 455/67.7 |
| 4,776,032 | 10/1988 | Odate et al. | 455/24 |
| 4,984,293 | 1/1991 | Cummings et al. | 455/226.1 |
| 5,015,973 | 5/1991 | Kawakami et al. | 333/132 |
| 5,109,535 | 4/1992 | Kume et al. | 455/67.4 |
| 5,625,889 | 4/1997 | Chikkaswamy et al. | 455/67.1 |

FOREIGN PATENT DOCUMENTS

| | | | |
|---|---|---|---|
| 000647136 | 12/1991 | Australia | H04B 17/00 |
| 0190731 | 4/1983 | Japan | H04B 1/16 |

*Primary Examiner*—Nguyen Vo
*Assistant Examiner*—Duc Nguyen
*Attorney, Agent, or Firm*—Collard & Roe, P. C.

[57] ABSTRACT

A circuit for testing the function of mobile radio receiving installations is provided, wherein the circuit generates an HF-output signal that is used to test the system. A frequency mixer receives an oscillation signal (8) generated from within the superheterodyne receiver and an IF-carrier oscillation signal (32) generated from and oscillator (7) within the circuit. The frequency mixer generates an HF-output signal (12) that is dependent on the amplitude and frequency of the received oscillation signals. In alternative embodiments of the invention, the circuit of the invention is incorporated into the superheterodyne receiver, and the generated IF-carrier frequency 32 is eliminated and replaced with an IF-signal 22 produced by self-excitation of the superheterodyne receiver. With multi-antenna scanning diversity systems, additional switches and switching signals are included.

14 Claims, 3 Drawing Sheets

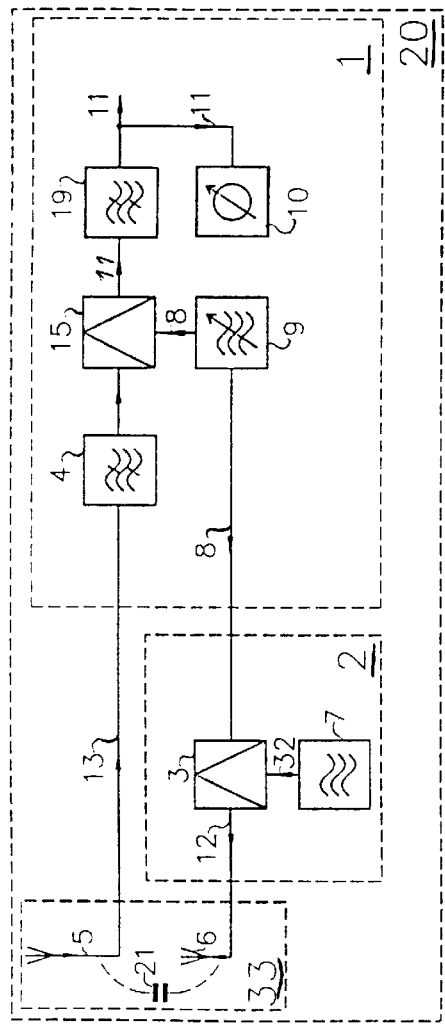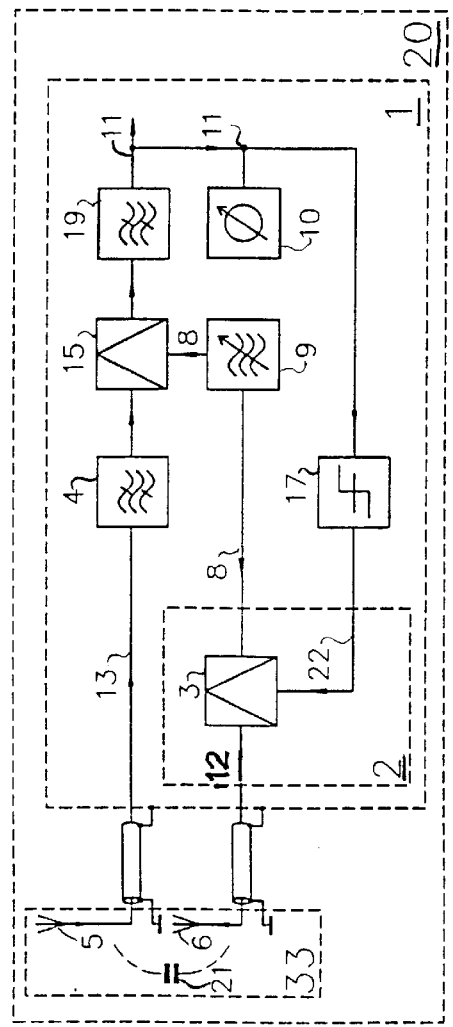

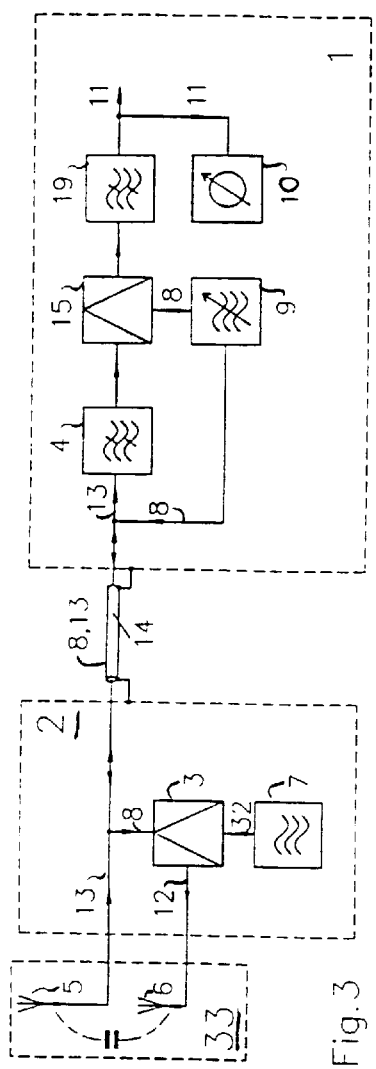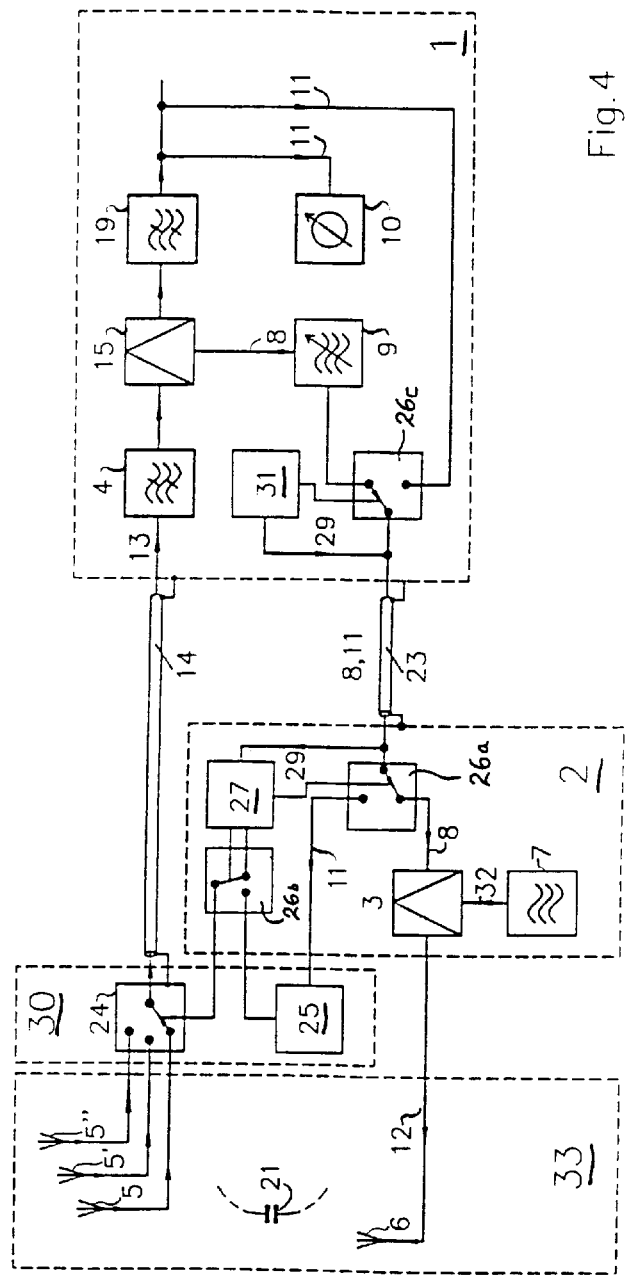
Fig. 3
Fig. 4

CIRCUIT FOR TESTING THE FUNCTION OF MOBILE RECEIVING INSTALLATIONS

BACKGROUND OF THE INVENTION

1. Field of the Invention

The present invention relates to mobile radio receiving installations. More particularly, it relates to a circuit for testing the operating functions of mobile radio receiving installation having at least one receiving antenna that is connected to a superheterodyne receiver equipped with an image frequency filter, and a measuring device for detecting the receiving signal level.

2. The Prior Art

In a practical application of radio receiving installations, there is a frequent problem of partial losses due to the aging of components and connectors. Unfortunately, these losses are difficult to detect during operation. Specifically, in a superheterodyne receiver, the feed line between the antenna and the receiver, and/or the antenna installation suffer from this aging problem.

When working with complicated receivers having a plurality of antennas and a diversity of systems, the testing of individual components is extremely costly due to their limited accessibility. According to the state of the art, test signals are used in the testing mode where the components of the installation, or the series circuit of the components, can be tested for proper functioning.

SUMMARY OF THE INVENTION

Therefore, it is a primary object of the present invention to provide a circuit that permits function testing of a mobile radio receiving installation over the frequency band that the superheterodyne receiver is set to receive.

It is another object of the invention to provide a circuit for the function testing of mobile radio receiving installations that minimizes the interference on other radio systems.

It is a further object of the invention to provide a circuit arrangement for the function testing of mobile radio receivers that can be implemented with a single antenna or a plurality of antennas, and scanning diversity systems.

It is yet another object of the invention to provide a circuit arrangement for the function testing of mobile radio receiving installations that operates efficiently and reliably.

These and other objects of the invention are achieved by providing a circuit arrangement having a frequency mixer within the receiver, and generating a high frequency (HF) output signal formed at the output of the frequency mixer. The oscillator signal of the superheterodyne receiver and the IF-carrier oscillation are also present during the test.

An oscillator signal is generated within the superheterodyne receiver and fed into the frequency mixer of the circuit. The frequency mixer receives a second IF-carrier signal from another oscillator contained within the circuit. The receiver oscillator signal and IF-carrier oscillation signal are combined by the frequency mixer to produce a high frequency (HF) output signal that serves as the test signal for the system. The HF-output signal has a frequency that conforms to the receiving frequency that the superheterodyne receiver is tuned to.

A coupling system receives the generated HF-output signal and couples it to the receiving antenna, either capacitively or inductively. The current functioning status of the receiver can then be measured on a measuring system contained within the superheterodyne receiver.

A significant advantage of the circuit arrangement of the invention is that a discrete test signal is exclusively transmitted on the frequency to which superheterodyne receiver is tuned. Thus, while the installation is in test mode, the receiving frequency can be tuned to a frequency gap (i.e, transmitter gap) which is not audibly occupied in the receiver by the received signal.

When working with automobile radio receivers, the installation should be tested for flawless functioning in any desired reception area. This testing must be capable of being performed with any broadcast signal or the like on a particular frequency band.

Furthermore, by tuning to a transmitter gap, or open band, the test signal is exclusively transmitted on the frequency where neighboring receiving systems are not tuned. This eliminates the risk of interference with other receivers. In practice, there are a large number of transmission gaps on radio bands. This enables one to conduct tests across the entire frequency band using a more targeted testing technique.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views:

FIG. 1 is a schematic block diagram of a first embodiment of the circuit according to the invention;

FIG. 2 is a schematic block diagram of a first modified embodiment of the circuit of FIG. 1 according to the invention;

FIG. 3 is a schematic block diagram of a second modified embodiment of the circuit of FIG. 1 according to the invention;

FIG. 4 is a schematic block diagram of the circuit according to the invention implemented with a diverse antenna system;

DETAILED DESCRIPTION OF PREFERRED EMBODIMENTS

Figure 5:
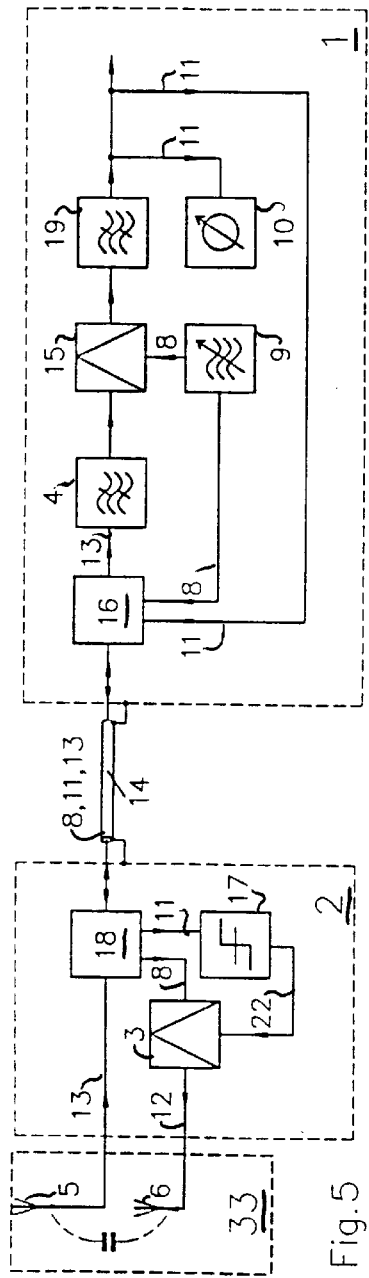
FIG. 5 is a schematic block diagram of a first modified embodiment of the circuit of FIG. 2 according to the invention.

Referring to the drawings, FIG. 1 shows a radio receiver 20 having a receiving antenna 5 and a superheterodyne receiver 1. Superheterodyne receiver 1 is HF-connected to receiving antenna 5 through line 13. According to the invention, an oscillator signal 8, generated by oscillator 9 within receiver 1, is coupled to a frequency mixer 3. Mixer 3, located within circuit arrangement 2, is additionally provided with an intermediate-frequency (IF) carrier signal 32 generated by oscillator 7. The frequency of IF-carrier signal 32 is set to be as close as possible to the mean frequency of IF-signal 11 of superheterodyne receiver 1. Frequency mixer 3 thus creates an HF-output signal 12 (i.e., test signal) having its frequency determined from the oscillator frequency 8 and IF-carrier signal 32. The HF-output signal's frequency corresponds with the receiving frequency to which superheterodyne receiver 1 is tuned, so that it is at least within the evaluation bandwidth of level measuring meter 10.

A coupler system 33 indirectly couples the HF-output signal 12 with the receiving antenna 5, or directly couples it with the receiver input with a defined amplitude, for example, via a capacitive coupler 21. Since image frequency filter 4 is necessarily present in superheterodyne receiver 1 for preventing image frequency reception, the image frequency formed in frequency mixer 3 is also filtered out.

In superheterodyne receiver 1, the received signal 13 is converted by a mixer 15 into the IF-signal 11 with the help of oscillator signal 8. The IF-signal 11 then passes through IF filter 19. Measuring system 10 can measure the receiving level on the receiving frequency since IF-signal 11 is an exact reproduction of received signal 13. This holds true when the receiving level in the receiver is not limited or controlled by measuring system 10. According to the state of the art, measured level of IF-signal 11 can be compared with a predetermined nominal value. If the measured value is within a preset range of the nominal value, this indicates that the receiver is in proper working order.

With the circuit of the invention, it is possible to carry out a large number of function tests. Examples of these tests would be: whether the superheterodyne receiver works correctly; whether all connections, e.g., HF-connection lines or other signal lines between the receiving antenna, the circuit arrangement, and the receiver are closed; whether the supply voltage is present (e.g., is it applied to the circuit arrangement or to the antenna amplifiers); whether an antenna amplifier is working; whether the antenna changeover switch installed in connection with multi-antenna diversity systems is functioning flawlessly; and, whether conductor interruptions are present in connection with antenna structures printed on the windowpane, or embedded in composite glass.

The result of the function test can be recorded in any suitable known way, such as, for example, by a measurement protocol, by an indicator using a display device, by audible sound, or by a combination of indication devices. Depending on the scope of the test for the various points of frequency support, the nominal values required can be made available by the memory of the mobile radio receiving installation, or by an externally located data storage.

With external data storage, a data transmission line between the external data storage and the mobile receiving installation is required to perform the function test. The comparison of the theoretical and actual measured values, and the functioning decision resulting from such comparison, can then also take place in an external test unit (i.e., in a unit operated separately from the receiver and connected via a data line) . The functioning decision is whether the receiving installation is working properly.

Figure 6:
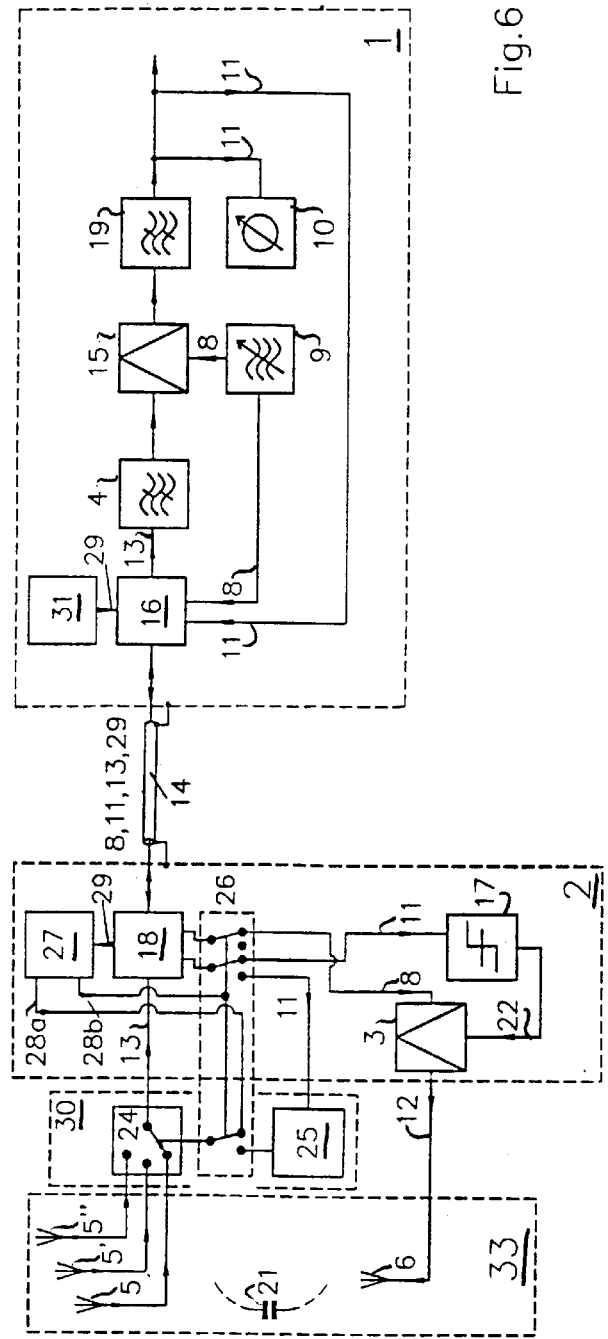
FIG. 6 is a schematic block diagram of a first modified embodiment of the circuit of FIG. 4, according to the invention.

In the circuit embodiments of the invention, the IF-carrier oscillation 32 can be generated by an oscillator 7 oscillating on the intermediate frequency of superheterodyne receiver 1. Since the amplitude of oscillator 7 is constant, and the amplitude of oscillator 9 on the receiver side is also constant, or kept constant via a limiter/amplifier 17, as shown in FIGS. 2, 5 and 6, a defined HF-output signal 12 with a constant amplitude is provided at the output of frequency mixer 3.

In its simplest form, frequency mixer 3 may be a series or parallel diode. In a preferred embodiment, frequency mixer 3 is a transistor designed to be an additive or multiplicative mixing stage. Due to decoupling by the transistor between the input and output, the HF-output signal 12 can be selectively picked up using a connected oscillating circuit. If frequency mixer 3 is used in the form of a transistor push-pull mixing stage, it is possible to reduce the requirements of the constant amplitude of the oscillator level supplied to frequency mixer 3.

In this configuration, th e oscillator level generated across the tuning range of the oscillator frequency must be sufficiently high to allow the push-pull mixing stage to work with the switching operation. If the amplitude variations of oscillator signal 8 are above the oscillator level leading to the switching operation, there will be no effect on the amplitude of the HF-output signal 12, thereby eliminating the need for a limiter/amplifier on oscillator signal 8. In addition, undesirable signal components are suppressed on the output of the push-pull mixing stage so that the emission of these undesirable or spurious signal components from coupling system 33 is avoided.

Spurious signals appearing on the output of frequency mixer 3 are further suppressed when a double-balanced mixer (double-symmetrically designed mixing stage) is used. This is due to the fact that both the IF-carrier frequency 32, and oscillator signal 8, are compensated at the output by the push-pull control. Such double-symmetrical mixing stages are available as "four-quadrant multipliers" in the form of integrated circuits, or as active or passive ring mixers.

The present invention provides superior advantages over the current state of the art when different radio signals are to be received. By reversing the structural elements of oscillator 7 in circuit 2, it is possible to generate different IF-carrier signals. The configuration of the internal structural elements determine the IF-carrier frequency 32. If, for example, the function of a mobile radio receiving installation 20 for receiving amplitude modulated long, medium and short-wave ranges is to be tested, the intermediate frequency of the AM-receiver, which is usually about 455 KHz, is selected as the IF-carrier frequency 32. When frequency-modulated radio signals of the ultra-short wave range are received, 10.7 MHz is typically selected as the IF-carrier oscillation 32. For testing the function of mobile receiving installation for receiving television signals, the IF of the video carrier (typically 38.9 MHz) or the IF of the audio carrier (33.3 MHz), or the auxiliary color carrier frequency is selected.

IF-carrier frequency 32 also can be generated by an amplifier with extremely high gain. This amplifier is controlled on its input, and includes a resonant circuit as an output filter connected, to its output. The natural frequency of the output filter is set as close as possible to the IF-mean frequency of superheterodyne receiver 1. Thus, the signal filtered out of the inherent noise of the amplifier becomes the IF-carrier frequency 32.

In an effort to keep the expenditure with respect to connection between the individual components extremely low, circuit arrangement 2, coupling system 33, and superheterodyne receiver 1 can be arranged to be located as close as possible to each other. However, such a configuration generally requires a large installation space, which is rarely available in modern automobiles.

When the required large installation spaces are not available, circuit arrangement 2 is integrated into superheterodyne receiver 1, and the HF-output signal 12 of frequency mixer 3 is supplied to coupling system 33 via a high-frequency line (FIG. 2).

Referring to FIG. 2, IF-oscillator 7 used to generate the IF-carrier frequency 32 can be replaced with the self-excitation of receiver 20 by means of circuit arrangement 2 contained within receiver 1.

Assuming that an unoccupied receiving channel is first selected as the testing frequency for the function test, a noise signal is received. When the mobile receiving installation is switched to the function test mode, the IF-signal 11, having the received noise, is first supplied to a control system in the form of an amplitude limiter 17. Limiter 17 receives IF-signal 11 and supplies it to frequency mixer 3 as IF-signal 22. IF-signal 22 is limited with respect to its amplitude. For example, when working with frequency-modulated (FM) receiver signals, amplitude limiter 17 is always present in superheterodyne receiver 1. In most cases, limiter 17 is usually in the form of an integrated circuit.

If the loop amplification of the entire receiving installation 20 is selected sufficiently high, the self-excitation condition will automatically be present. This is due to the fact that the phase condition for such self-excitation is automatically obtained as a result of the band-limiting effect of IF-selection for signals containing noise. Measuring system 10 for detecting the reception level should, in this case, be adapted to detect the RMS-value (root-mean-square).

FIG. 3 shows another embodiment of the receiving installation according to the invention. Superheterodyne receiver 1 is connected to circuit arrangement 2 via an HF-connection line 14. HF-connection line 14 is generally designed as a coaxial line, and transmits receiving signal 13 received from receiving antenna 5 to superheterodyne receiver 1. HF-connection line 14 simultaneously supplies oscillator signal 8 of superheterodyne receiver 1 to circuit arrangement 2. Any excessive reduction or attenuation of oscillator signal 8 by the input impedance of image frequency filter 4 is avoided through suitable dimensioning. The oscillator signal 8 is also sufficiently suppressed on the output of filter 4 that filters the image frequency. Both preventive measures can be implemented through suitable dimensioning according to the state of the art.

With adjustments of the level conditions, oscillator signal 8 is selected such that it will be a dominant signal that exceeds receiver signal 13 at least by one decimal power. This is accomplished by adjusting the required level conditions with respect to conversion gain or conversion loss in frequency mixer 3 (through suitable dimensioning), and through detection of the coupled damping in coupling system 33. HF-output signal 12 is determined, with respect to its amplitude, solely by the dominant oscillator signal 8, and by the amplitude of IF-carrier frequency 32.

According to the invention, coupling system 33 consists of the receiving antenna 5 which is indirectly coupled to HF-output signal 12 of frequency mixer 3, for example, via an electromagnetic wave. HF-output signal 12 is supplied, for example, to a transmitting antenna 6. Transmitting antenna 6 can be secured on the motor vehicle in a suitable location, and is adapted to transmit the HF-output signal 12. If receiving antenna 5 is designed in the form of a windowpane antenna, it is particularly advantageous if transmitting antenna 6 and receiving antenna 5 are manufactured together. This manufacturing can be done by the screen printing method used in conjunction with single-pane safety glass windows, or in the form of embedded wires, in connection with composite safety glass windows. Damping of coupling system 33 substantially depends upon the physical distance between transmitting antenna 6 and receiving antenna 5, and their respective operating parameters. Capacitive antennas are preferably excited capacitively, and magnetically operating antennas are preferably excited inductively.

Coupling system 33 may, in accordance with the invention, also be designed by supplying HF-output signal 12 to the connection of the receiving antenna via a low coupling capacity (e.g., a few pico farads (pf) in the ultra-short wave range).

For receiving antennas designed as windowpane antennas, HF-output signal 12 can be fed into an HF-line printed on the windowpane. If, for example, several receiving antennas are disposed on one side of the window frame, as may be the case for multi-antenna diversity systems, the HF-line is also printed on the window frame. For example, HF-line can be in the form of an asymmetric coplanar line, and installed along the antenna structures across short distances by liner branches. In this configuration, the HF-output signal is substantially capacitively coupled to the receiving antenna structures. The printed HF-line is usually terminated at its end with its wave impedance in order to obtain an approximately constant flow of current and voltage along the printed HF-line.

With multi-antenna scanning diversity systems (FIG. 4), the receiving antennas 5, 5', and 5" are connected to the superheterodyne receiver 1 via an antenna selector switch 24. The antenna selector switch 24 coupled to HF-connection line 14, is controlled by a trouble indicator 25. In diversity operation, IF-signal 11 is supplied to trouble indicator 25 via change-over switch 26a and a second HF-connection line 23. The diversity processor circuit 30 includes trouble indicator 25 and antenna selector switch 24. If the receiving signal 13 actually being switched, contains noise, trouble indicator 25 generates an antenna change-over or selector signal. The antenna change-over signal is supplied to antenna selector switch 24 via a second selector switch 26b in circuit 2. In the function test, a switching signal generator 31 is activated in the receiver for generating a switching signal 29. In the simplest case, switching signal 29 is a DC voltage that is switched to the internal conductor of second HF-connection line 23 via a choke or any other suitable connection. The choke or other connection should have a high impedance with respect to frequency signals.

Circuit arrangement 2 contains a switching signal evaluator circuit 27 which can be a simple comparator. Evaluator circuit 27 is responsive to switching signal 29, in circuit arrangement 2, for changing from a diversity antenna operation to a function test operation. In the function test operational mode, oscillator signal 8 is switched by selector switch 26c on the receiver side to the second HF-connection line 23, instead of IF-signal 11. In selector switch 26a, on the circuit arrangement side, the connection to trouble indicator 25 is interrupted and oscillator signal 8 is connected to frequency mixer 3. In order to enable the function test to be carried out with different antennas. Antenna selector switch 24 is then sequentially switched by switching signal generator 31. Switching signal generator 31 can change the position of switch 24 by coding a special switching signal. The decoding of the switching signal is performed by switching signal evaluator 27. Thus, the special switching signal only acts upon change-over switch 26b in circuit arrangement 2.

Selector switch 26c, in receiver 1, can be replaced by a simple on/off switch which will only add oscillator signal 8 to IF-signal 11 for the function test. This will always be the case when the level of oscillator signal 8 is clearly higher than the level of IF-signal 11.

FIGS. 5 and 6 show embodiments of the invention for a single-antenna and multi-antenna diversity receiving installations, respectively. In each embodiment, only a single HF-connection line 14 is used. By using only a single HF-connection line 14, the number of HF-plug contacts is reduced, and the operational reliability of the overall receiving installation is increased. In addition, such a design is more economical since a second HF-connection line is not needed. Since several HF-signals now have to be transmitted via the signal HF-connection line 14, and in order to prevent the various signals from interfering with each other, signal switches 16 and 18 are needed on both the receiver and circuit side, respectively.

Signal switches 16 and 18 are known from multi-antenna scanning diversity systems. According to the state of the art, the IF-signal 11 is transmitted in diversity operation in addition to the receiving signal 13 via the single HF-connection line 14. A switching signal can be additionally transmitted over HF-connection line 14 for changing the system from a diversity operation, to a single-antenna operation.

According to the invention, signal switches 16 and 18 are given an additional function, so that the overall installation can be tested for proper functioning.

In FIGS. 5 and 6, the function test is carried out by self-excitation in the manner described for the circuit of FIG. 2. Accordingly, in case of single antenna reception, receiving signal 13, oscillator signal 8 and IF-signal 11 have to be transmitted via HF-connection line 14. HF-connection line 14 is generally coaxial because of the well known superior screening and shielding properties of such cables. A switching signal 29 is additionally transmitted as explained in FIG. 4 with the multi-antenna diversity reception.

During the function test, signal switch 16 couples oscillator signal 8 and IF-signal 11 to HF-connection line 14. HF-receiving signal 13 is looped through HF-connection line from receiving antenna 5 to receiver 1. IF-signal 11, and oscillator signal 8 are picked up on signal switch 18 and supplied to frequency mixer 3. In this configuration, signal switches 16 and 18 are designed as direction-selective or frequency-selective. For enhancing the selection properties for the signal switches, signal switches with directional selectivity in the form of directional couplers can be further designed to include frequency-selectivity.

When signal switches according to the art are used with FM-multi-antenna scanning diversity systems, coupling and decoupling of the oscillator signal can be easily accomplished by means of a series resonance circuit. If all other signals on the HF-connection line are dominated by the level of the oscillator, no selection devices are required for the IF-signal other than those needed for coupling and decoupling.

While several embodiments of the present invention have been shown and described, it is to be understood that many changes and modifications may be made thereunto without departing from the spirit and scope of the invention as defined in the appended claims.

What is claimed is:

1. A circuit for testing the working function of a mobile receiving installation (20) having at least one receiving antenna (5) in a high frequency connection with a superheterodyne receiver (1), the superheterodyne receiver (1) having an image frequency filter (4), an oscillator (9), an IF-signal (11) and a measuring system (10) coupled to the IF-signal for detecting the level of the received signal, the circuit comprising:

a circuit arrangement (2) disposed within the receiving installation (20) and coupled to the superheterodyne receiver (1) and the at least one antenna (5), said circuit arrangement comprising:

a frequency mixer (3) having a first input coupled to an output of oscillator (9) in superheterodyne receiver (1), a second input and an output, oscillator (9) generating an oscillator signal (8);

a feedback loop connecting the IF-signal (11) to said second input of said frequency mixer (3) to provide a self excitation condition, thereby generating an IF-carrier frequency (22), of limited amplitude from the IF-amplifier part of the superheterodyne receiver (1);

said frequency mixer (3) producing an HF-output signal (12) having a constant amplitude with respect to time at its output, said HF-output signal (12) having a frequency conforming to a receiving frequency to which the superheterodyne receiver (1) is tuned, said receiving frequency being dependent on said oscillator frequency (8) and said IF-carrier frequency (22);

a coupling system (33) having at least one input and coupled to said circuit arrangement to receive said HF-output signal (12), said coupling system coupling said HF-output signal (12) to the at least one receiving antenna (5) or a receiver input, so that the level of the receiving signal of the receiving installation (20) can be determined by said measuring system (10).

2. The circuit for testing the working function of a mobile receiving installation (20) according to claim 1, wherein the superheterodyne receiver (1) is displaced from the receiving antenna (5), and further comprises an HF-connection line (14) connecting the receiver (1) with the receiving antenna (5).

3. A circuit for testing an RF superheterodyne receiver installation (20) over its reception band and coupled to at least one antenna (5), through a first RF connection line (14), for receiving an RF-receiving signal (13), the receiver (1) having an image frequency filter (4), a local oscillator (9), for producing a variable output signal (8) as the receiver is tuned, an IF-signal (11) and a measuring system (10) coupled to the IF-signal for detecting the level of the received signal, the circuit comprising:

circuit arrangement (2) disposed within the receiver installation (20) and coupled to the superheterodyne receiver (1) and the at least one antenna (5), said circuit arrangement comprising:

a second RF-connection line (23) connecting the superheterodyne receiver (1) with the circuit arrangement (2), said second RF-connection line (23) carrying said local oscillator signal (8) and the IF signal (11);

a fixed frequency oscillator (7) for producing an IF-carrier frequency (32) approximately equal to the mean frequency of the IF-signal (11);

a mixer (3) having its inputs coupled to the local oscillator (9) and fixed oscillator (7) for mixing the fixed and local oscillator signals (32 and 8) to produce an output signal 12 having a constant amplitude and a frequency conforming to a receiving frequency to which the superheterodyne receiver (1) is tuned, said receiving frequency being dependent on said fixed oscillator frequency (8) and said IF-carrier frequency (32);

a coupling system (33) having at least one input coupled to said circuit arrangement (2) to receive said RF-output signal (12), a transmitting antenna (6) coupling said RF-output signal (12) to the at least one receiving antenna (5) said antenna being a low capacitive connection (21) so that the level of the receiving signal of the receiving installation (20) is determined by said measuring system (10), as the superheterodyne receiver (1) is tuned over its reception band.

4. The circuit for testing the working function of a mobile receiving installation (20) according to claim 3, wherein said coupling system (33) is printed using a screen printing method adjacent receiving antenna (5) associated with single-pane safety glass windows.

5. The circuit for testing the working function of a mobile receiving installation (20) according to claim 3, wherein said coupling system (33) is disposed in the form of embedded wire or wires associated with composite safety glass windows.

6. The circuit for testing the working function of a mobile receiving installation (20) according to claim 3, wherein the HF-output signal (12) is generated and the function test is performed during a transmission gap which is determined by detecting a receiving level in the superheterodyne receiver (1) being dependent on a receiving frequency.

7. The circuit for testing the working function of a mobile receiving installation (20) according to claim 3, wherein said receiving antenna (5) is an antenna scanning diversity system, and further comprising:
- a switch signal generator (31) disposed within the superheterodyne receiver (1) and adapted to generate a switching signal (29);
- a diversity processor (30) having a signal selector switch (24) and a trouble indicator (25), said diversity processor (30) being supplied with the IF-signal (11) and said switching signal (29) via said second HF-connection line (23), said switching signal (29) initiating the function test.

8. The circuit for testing the working function of a mobile receiving installation (20) according to claim 7, wherein said switching signal (29) is formed such that the signals of the receiving antenna (5, 5', ,5") are sequentially switched by said signal selector switch (24) to the superheterodyne receiver (1) and tested.

9. A circuit for testing an RF superheterodyne receiver (1) over its reception band having at least one receiving antenna (5), for receiving an RF receiving signal (13), the receiver (1) having an image frequency filter (4), a local oscillator (9), for producing a variable output signal (8) as the receiver is tuned, an IF-signal (11) and a measuring system (10) coupled to the IF-signal for detecting the level of the received signal, the circuit comprising:
- an RF connection line (14) coupling the antenna (5) to receiver (1);
- a first signal switch (16) disposed within the receiver (1) and coupled to the oscillator signal (8) and the IF-signal (11), said first signal switch (16) being coupled to a first end of said RF-connection line (14);
- a circuit arrangement (2) disposed within the receiver installation (20) and coupled through said RF connection line (14) to the superheterodyne receiver (1), and the at least one antenna (5), and wherein said local oscillator signal (8), the IF-signal (11) and the RF-receiving signal (13) are selectively transmitted across said RF-connection line (14), said circuit arrangement (2) comprising;
- a second signal switch (18) disposed within circuit arrangement (2) and coupled to the opposite end of said RF-connection line (14), said second signal switch (18) picking up IF-signal (11),
- a frequency mixer (3) coupled to said second switch (18) for receiving local oscillator signal (8);
- an amplitude limiter (17) coupled to second switch (18) for receiving IF-signal (11) and providing to mixer (3), an IF-signal (22), limited in amplitude,
- said mixer (3) producing an RF-output signal (12) at its output having a constant amplitude and a frequency conforming to a receiving frequency to which the superheterodyne receiver (1) is tuned, said receiving frequency being dependent on said fixed oscillator frequency (8) and said IF carrier frequency (11);
- a coupling system (33) having at least one input and coupled to said circuit arrangement to receive said RF-output signal (12), said coupling system coupling said RF-output signal (12) to the at least one receiving antenna (5) or a receiver input,
- wherein the RF-receiving signal (13) from antenna (5) is coupled to said second signal switch (18) and is transmitted across said RF-connection line (14) to said first signal switch (16) and coupled to the superheterodyne receiver (1), said first and second signal switches (16 and 18) being selected such that the signals on RF-connection line (14) do not interfere with each other,
- wherein the level of the receiving signal of the receiving installation (20) is determined by said measuring system (10), as the superheterodyne receiver (1) is tuned over its reception band.

10. The circuit for testing the working function of a mobile receiving installation (20) according to claim 9, wherein at least one of said first and second signal switches (16 and 18) are direction-selective.

11. The circuit for testing the working function of a mobile receiving installation (20) according to claim 9, wherein at least one of said first and second signal switches (16 and 18) are frequency-selective.

12. The circuit for testing the working function of a mobile receiving installation (20) according to claim 9, wherein at least one of said first and second signal switches (16 and 18) is designed direction-selective by directional couplers, and is also frequency-selective for supporting selection properties.

13. A circuit for testing an RF superheterodyne receiver (1) over its reception band having at least one antenna (5), for receiving an RF-receiving signal (13), superheterodyne receiver (1) having an image frequency filter (4), a local oscillator (9), for producing a variable output signal (8) as the receiver is tuned, an IF-signal (11) and a measuring system (10) coupled to the IF-signal for detecting the level of the received signal, the circuit comprising:
- an RF connection line disposed between said antenna (5) and said receiver (1);
- a circuit arrangement (2) coupled to line (14) between the antenna (5) and superheterodyne receiver (1) comprising:
- a mixer (3) having a first input for receiving frequency (8) of receiver (1), a second input for receiving an amplitude limited IF-signal (22);
- said frequency mixer (3) producing an RF-output signal (12) having a constant amplitude at its output, said RF-output signal (12) having a frequency conforming to a receiving frequency to which the superheterodyne receiver (1) is tuned, said receiving frequency being dependent on said fixed oscillator frequency (8) and said IF-signal (22); and
- wherein the receiving antenna (5) is an antenna scanning diversity system, and further comprises;
- a diversity processor (30) having a signal change-over switch (24) and a trouble indicator (25), said processor (30) being supplied with the IF-signal (11) from receiver (1), said RF-connection line (14) connecting said diversity processor (30) with the superheterodyne receiver (1);

a coupling system (33) having at least one input to receive said RF-output signal (12), from said circuit arrangement (2), said coupling system coupling said RF-output signal (12) to the at least one receiving antenna (5), a switch signal generator (31) disposed within the superheterodyne receiver (1) and adapted to generate a switching signal (29), said diversity processor (30) being coupled with the IF-signal (11) and said switching signal (29) via the single RF-connection line (14), said switching signal (29) initiating the function test, so that the level of the receiving signal of the receiving installation (20) is determined by said measuring system (10), as the superheterodyne receiver (1) is tuned over its reception band.

14. The circuit for testing the working function of a mobile receiving installation (20) according to claim 13, further comprising:

a first signal switch (16) disposed within the receiver (1) and being supplied with said oscillator signal (8), the IF-signal (11), and said switching signal (29), said first signal switch (16) being coupled to said HF-connection line (14);

a second signal switch (18) disposed within circuit arrangement (2) and coupled to the opposite end of HF-connection line (14), said second signal switch transmitting said switching signal within said circuit arrangement (2); and wherein when the installation function is tested, said oscillator signal (8) is also transmitted via HF-connection line (14), said oscillator signal (8) having a level selected so that no additional selection measures are required in said signal switches (16 and 18).

* * * * *